Jan. 3, 1956     G. B. ELLIS     2,729,694
BATTERY SEPARATOR
Filed Sept. 1, 1953
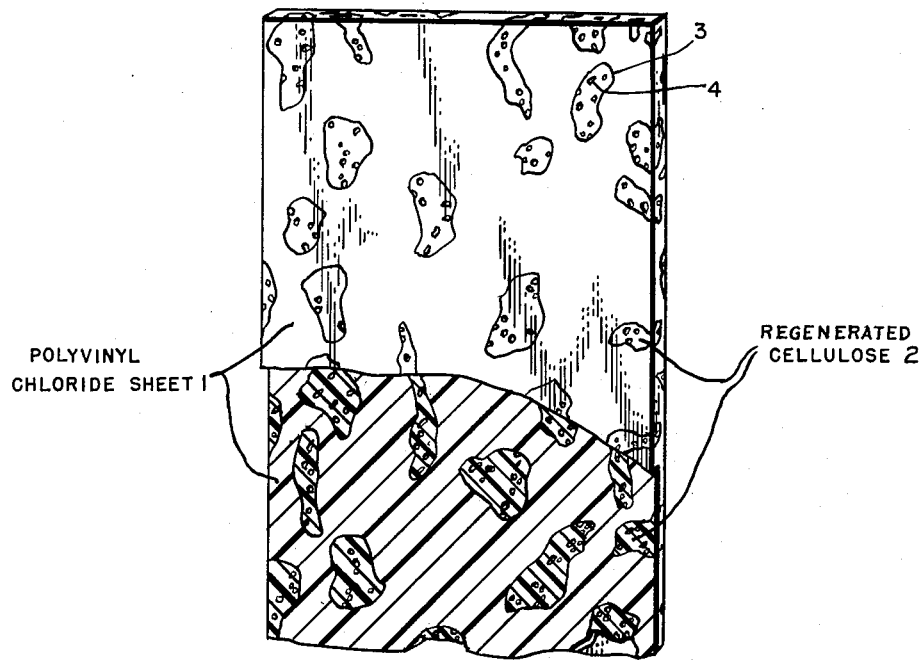
INVENTOR.
GRENVILLE B. ELLIS
BY
*Harry M. Saragovitz*
ATTORNEY

United States Patent Office 2,729,694
Patented Jan. 3, 1956

2,729,694
BATTERY SEPARATOR

Grenville B. Ellis, Red Bank, N. J., assignor to the United States of America as represented by the Secretary of the Army Application September 1, 1953, Serial No. 377,991

3 Claims. (Cl. 136—145)

(Granted under Title 35, U. S. Code (1952), sec. 266)

The invention described herein may be manufactured and used by or for the Government for governmental purposes without the payment of any royalty thereon.

This invention relates to minutely porous and ionically permeable barriers to be inserted between the electrodes of primary dry cells for the purpose of spacing them physically apart and inhibiting migration of deleterious material from one electrode to the other. The invention relates more particularly to such barriers as used in alkaline dry cells comprising essentially a zinc anode, a mercuric oxide depolarizer, and an immobilized alkaline electrolyte.

It has been known to make barrier discs for dry cells from various materials as for instance from sheets of minutely porous, pressed polystyrene fiber, nylon fiber, etc. It has also been suggested to form such discs from pressed powders of polystyrene, vinyl resins and vinylidine resins. Glycerin-plasticized sheets of polyvinyl alcohol, parchment paper of dialysis grade and regenerated sheet cellulose have also been proposed. Moreover, inorganic materials such as magnesium silicate, pressed ceramics or glass, micro-porous rubber, or asbestos sheets have sometimes been used.

The material used for such barriers must be inert to the chemical and electro-chemical reactions that occur in the cell, it must be permeable to the electrolyte and it must substantially limit or prevent travel of deleterious materials between the electrodes. Where a soluble depolarizer is used the barrier also acts to retard its resolution.

Micro-porous cellophane is known to be one of the best materials for making barriers as far as micro-porosity is concerned, because it possesses not only the proper micro-porosity but also low electrical resistance and high ionic conductivity. This material has, however, a great disadvantage in that it is not stable, particularly not in caustic electrolytes, where it tends to become brittle. This is particularly the case if silver-peroxide is used as the cathode, as for instance, in batteries utilizing the electro-chemical system zinc-silver peroxide in an alkaline electrolyte.

It is an object of this invention to overcome the disadvantages of micro-porous cellophane by combining it with a material of inferior micro porosity but greater mechanical strength. The new combination provides both mechanical strength and the necessary porosity for good ionic flow between the electrodes with a minimum of electrical resistance.

The following description of specific embodiments will illustrate the broad inventive idea in conjunction with the accompanying drawing which shows a porous polyvinyl chloride sheet 1 the pores 2 of which are too large to prevent migration of deleterious material between the electrodes. This sheet 1 is impregnated with cellophane 2 by dipping the polyvinyl chloride sheet into a liquid consisting essentially of cellulose xanthate. Such a solution is made in well known manner by treating cellulose with caustic, removing the excess caustic and adding carbon bi-sulfide to obtain cellulose xanthate which is whipped into a more or less viscose solution. The polyvinyl chloride sheet is now dipped into the solution of cellulose xanthate, and removed from the same after sufficient material has been soaked into the pores of the polyvinyl chloride sheet. The impregnated sheet is now dipped into a bath of sulphuric acid and epsom salt that coagulates cellulose xanthate, leading to the formation of micro-porous cellophane 3 (the micro pores of which are indicated at 4) within the pores 3 of the polyvinyl chloride sheet 1. Cellophane lacquers may of course also be used as the impregnating solution.

This new combination of a mechanically strong polyvinyl chloride material of larger porosity with an ultra-microporous cellophane set up in the pores of the polyvinyl chloride has proved to provide a barrier that remains very stable in the presence of an alkaline electrolyte even if used in batteries with silver peroxide electrodes. This new composite material does not become brittle and therefore does not crack and does not disintegrate within the cell; in addition to its mechanical strength it shows the ionic conductivity and the low electrical resistance of micro-porous cellophane.

Instead of the porous polyvinyl chloride material other similarly porous materials such as porous polystyrene, porous rubber or woven cloth made from appropriate materials may be used. In fact any material woven or unwoven having porous structure of great tensile strength may be used if it is inert to the chemical and electro-chemical reactions occurring in the cell and capable of setting up within its porous structure another material of micro-porous character and good ionic permeability.

Instead of micro-porous cellophane other micro-porous materials having the ionic conductivity of cellophane may be used for the impregnation of the porous polyvinyl chloride or its substitutes.

It has been found that the material of larger porosity may also be impregnated with various micro-porous ion exchange resins. Such a combination may be made for instance by impregnating a porous polyvinyl chloride sheet with a solution of polystyrene sulfonic acid or a solution of polymeric meta phenylin diamine.

It has been found that it is also possible to impregnate polyvinyl chloride with a mixture of various micro-porous materials such as a mixture of methyl cellulose and polyvinyl alcohol. It is also possible to impregnate the material of larger porosity with micro-porous inorganic materials such as ceramics. Certain types of parchment paper may also be used.

While the invention has been illustrated by specific embodiments it will be evident to those skilled in the art that the inventive idea consists broadly in impregnating a larger porosity material with an ultra micro-porous substance whereby the larger porosity material is required to have sufficient mechanical strength while the microporosity substance must be ionically permeable but prevent migration of deleterious material from one electrode to the other. The larger porosity material acts as a mechanical support for the ultra micro-porous material.

Batteries containing composite barriers according to the invention show an improved shelf life, greater capacity and greater shock resistance. If the new barrier is used in rechargeable batteries or batteries of limited rechargeability the cycle life of such batteries is greatly improved. In some cases all of these advantages are increased by employing as the ultra microporous material an ion exchange resin which has the proper ion discriminatory qualities so as to allow only one type of ions to migrate while other types of ions are retained by the ion exchange resin.

The new composite barriers have been used to great advantage in alkaline, zinc-mercuric oxide dry batteries;

in zinc-silver peroxide batteries of limited rechargeability; in magnesium cuprous chloride batteries and in other types of batteries where special purpose applications call for improved qualities.

What is claimed is:

1. A method of making a composite ionically permeable barrier comprising impregnating a polyvinyl chloride sheet with cellulose xanthate, treating the impregnated sheet with a solution of sulphuric acid and epsom salt so as to precipitate micro-porous cellophane within the pores of the polyvinyl chloride sheet.

2. A composite ionically permeable carrier to be inserted between the electrodes of primary cells comprising a porous polyvinyl chloride acting as a mechanical support, the pores of said supporting material containing ultra micro-porous cellophane of high ionic conductivity and low electric resistance.

3. A composite ionically permeable barrier to be inserted between the electrodes of primary cells comprising a porous polyvinyl chloride acting as a mechanical support, the pores of said supporting material containing a mixture of ultra micro-porous cellophane and polyvinyl alcohol of high ionic conductivity and low electric resistance.

References Cited in the file of this patent

UNITED STATES PATENTS

| | | |
|---|---|---|
| 2,366,007 | D'Alelio | Dec. 26, 1944 |
| 2,393,967 | Brubaker et al. | Feb. 5, 1946 |
| 2,607,809 | Pitzer | Aug. 19, 1952 |
| 2,636,851 | Juda et al. | Apr. 28, 1953 |

OTHER REFERENCES

Permionic Membranes, phamphlet by Ionics Incorporated, 1951, pages 2–6.